US010747204B2

(12) United States Patent
Ziegler et al.

(10) Patent No.: US 10,747,204 B2
(45) Date of Patent: *Aug. 18, 2020

(54) AUTOMATED STORAGE AND RETRIEVAL SYSTEM AND CONTROL SYSTEM THEREOF

(71) Applicant: Symbotic, LLC, Wilmington, MA (US)

(72) Inventors: Melanie Ziegler, Andover, MA (US); Russell G. Barbour, Natick, MA (US); Matt Earl, Burlington, MA (US)

(73) Assignee: Symbotic LLC, Wilmington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/182,460

(22) Filed: Nov. 6, 2018

(65) Prior Publication Data

US 2019/0072939 A1 Mar. 7, 2019

Related U.S. Application Data

(63) Continuation of application No. 15/677,309, filed on Aug. 15, 2017, now Pat. No. 10,120,370, which is a
(Continued)

(51) Int. Cl.
*G05B 19/414* (2006.01)
*G05B 19/418* (2006.01)
(Continued)

(52) U.S. Cl.
CPC ......... *G05B 19/4148* (2013.01); *B65G 1/137* (2013.01); *G05B 19/4185* (2013.01);
(Continued)

(58) Field of Classification Search
CPC .............................. B65G 1/137; G05B 19/4148
See application file for complete search history.

(56) References Cited

U.S. PATENT DOCUMENTS 4,607,256 A * 8/1986 Henzel ................ G06F 11/2005
340/9.1
4,837,704 A 6/1989 Lengefeld
(Continued)

FOREIGN PATENT DOCUMENTS

CN 20100316470 12/2010
DE 20011661 12/2000
(Continued)

OTHER PUBLICATIONS

Martin Hosek, et al, "On-The-Fly Substrate Eccentricity Recognition for Robotized Manufacturing Systems," ASME, pp. 206-216, Feb. 2005, Transactions of the ASME, vol. 127.
(Continued)

*Primary Examiner* — Thomas Randazzo
(74) *Attorney, Agent, or Firm* — Perman & Green, LLP

(57) ABSTRACT

An automated storage and retrieval system includes a storage space with storage locations defined therein, an automated transport system connected to the storage space and configured to transport store units for storage in the storage locations and retrieval from the storage locations, and a control system disposed for managing throughput performance of the automated storage and retrieval system, the control system being operably coupled to the automated transport system and having more than one separate and distinct control sections each configured for managing throughput performance with respect to a common group of the storage locations, wherein at least one of the control sections manages aspects of throughput performance of the common group independent of another of the control sections.

16 Claims, 9 Drawing Sheets

Related U.S. Application Data continuation of application No. 14/229,004, filed on Mar. 28, 2014, now Pat. No. 9,733,638.

(60) Provisional application No. 61/809,188, filed on Apr. 5, 2013.

(51) Int. Cl.
*B65G 1/137* (2006.01)
*G06Q 10/08* (2012.01)

(52) U.S. Cl.
CPC ........... *G06Q 10/08* (2013.01); *G06Q 10/087* (2013.01); *G05D 2201/0216* (2013.01)

(56) References Cited

U.S. PATENT DOCUMENTS

| | | | |
|---|---|---|---|
| 4,879,644 A | 11/1989 | Gottshall | |
| 5,111,401 A | 5/1992 | Everett et al. | |
| 5,171,120 A * | 12/1992 | Bernard, II | B65G 1/0485 198/347.2 |
| 5,229,931 A | 7/1993 | Takeshima et al. | |
| 5,440,494 A | 8/1995 | Akamaru | |
| 5,472,309 A * | 12/1995 | Bernard, II | B65G 1/0485 414/807 |
| 5,699,242 A | 12/1997 | Togawa et al. | |
| 5,985,214 A * | 11/1999 | Stylli | B01J 19/00 422/63 |
| 6,027,112 A | 2/2000 | Guenther et al. | |
| 6,039,316 A | 3/2000 | Jackson et al. | |
| 6,061,607 A * | 5/2000 | Bradley | B65G 1/1376 414/273 |
| 6,119,052 A | 9/2000 | Guenther et al. | |
| 6,240,335 B1 * | 5/2001 | Wehrung | G05B 19/4182 700/230 |
| 6,260,049 B1 | 7/2001 | Fitzgerald et al. | |
| 6,278,907 B1 | 8/2001 | Fromherz et al. | |
| 6,289,260 B1 * | 9/2001 | Bradley | B65G 1/1373 414/273 |
| 6,512,970 B1 | 1/2003 | Albert | |
| 6,577,925 B1 | 6/2003 | Fromherz | |
| 6,598,859 B1 | 7/2003 | Kureck et al. | |
| 6,662,076 B1 * | 12/2003 | Conboy | G05B 19/4189 414/935 |
| 6,754,634 B1 | 6/2004 | Ho | |
| 6,758,802 B2 | 7/2004 | Fitzgerald et al. | |
| 6,951,274 B2 * | 10/2005 | Zeitler | B65G 47/52 198/370.02 |
| 7,043,309 B2 | 5/2006 | Jackson et al. | |
| 7,127,411 B2 | 10/2006 | Ho | |
| 7,149,606 B2 | 12/2006 | Krause | |
| 7,260,733 B2 * | 8/2007 | Ichikawa | G05B 19/4148 340/3.2 |
| 7,289,867 B1 | 10/2007 | Markle et al. | |
| 7,317,987 B2 | 1/2008 | Nahla | |
| 7,319,907 B2 * | 1/2008 | Kasdan | G01N 15/1456 600/322 |
| 7,343,222 B2 | 3/2008 | Solomon | |
| 7,389,210 B2 | 6/2008 | Kagarlis | |
| 7,536,283 B2 | 5/2009 | Potter et al. | |
| 7,894,932 B2 | 2/2011 | Mountz et al. | |
| 7,894,933 B2 | 2/2011 | Mountz et al. | |
| 7,972,102 B2 * | 7/2011 | Ward | B65G 63/004 414/137.1 |
| 7,991,505 B2 * | 8/2011 | Lert, Jr. | B65G 1/0492 198/347.1 |
| 8,041,451 B2 | 10/2011 | Wu et al. | |
| 8,082,059 B2 * | 12/2011 | Schaefer | B65G 1/1373 700/217 |
| 8,108,138 B2 | 1/2012 | Bruce et al. | |
| 8,112,176 B2 | 2/2012 | Solomon | |
| 8,190,288 B2 | 5/2012 | Rohrauer et al. | |
| 8,280,623 B2 | 10/2012 | Trepagnier et al. | |
| 8,341,040 B1 | 12/2012 | Young et al. | |
| 8,425,173 B2 * | 4/2013 | Lert | B65G 1/1373 414/280 |
| 8,594,835 B2 * | 11/2013 | Lert | B65G 1/1373 700/221 |
| 8,965,561 B2 * | 2/2015 | Jacobus | G06Q 10/087 700/216 |
| 9,008,884 B2 * | 4/2015 | Toebes | B65G 1/0492 701/23 |
| 9,146,553 B2 * | 9/2015 | Nettleton | G05B 19/4148 |
| 9,270,478 B2 * | 2/2016 | Red | H04L 12/2803 |
| 9,733,638 B2 * | 8/2017 | Ziegler | G06Q 10/087 |
| 10,120,370 B2 * | 11/2018 | Ziegler | G05B 19/4185 |
| 2002/0110155 A1 | 8/2002 | Pearce et al. | |
| 2002/0164242 A1 | 11/2002 | Wehrung et al. | |
| 2002/0185358 A1 * | 12/2002 | Zeitler | B65G 47/52 198/370.02 |
| 2003/0028275 A1 | 2/2003 | Fromherz et al. | |
| 2004/0111536 A1 | 6/2004 | Ellerbrock et al. | |
| 2004/0158666 A1 | 8/2004 | Korowitz et al. | |
| 2007/0010898 A1 | 1/2007 | Hosek et al. | |
| 2007/0017984 A1 * | 1/2007 | Mountz | G06Q 10/087 235/385 |
| 2007/0276535 A1 * | 11/2007 | Haag | B65G 1/0482 700/217 |
| 2008/0046121 A1 | 2/2008 | Pao et al. | |
| 2009/0074545 A1 | 3/2009 | Lert, Jr. et al. | |
| 2009/0185884 A1 * | 7/2009 | Wurman | B65G 1/1378 414/270 |
| 2010/0172728 A1 * | 7/2010 | Amada | B66F 9/07 414/659 |
| 2011/0301757 A1 | 12/2011 | Jones et al. | |
| 2012/0029802 A1 | 2/2012 | Barry et al. | |
| 2012/0186942 A1 * | 7/2012 | Toebes | B65G 1/06 198/429 |
| 2012/0195720 A1 * | 8/2012 | Sullivan | B65G 1/04 414/277 |
| 2013/0316470 A1 | 11/2013 | Zhou | |
| 2016/0140488 A1 * | 5/2016 | Lindbo | B65G 1/1373 705/28 |

FOREIGN PATENT DOCUMENTS

| | | |
|---|---|---|
| EP | 0989498 | 3/2000 |
| EP | 1598291 | 11/2005 |
| EP | 1627830 | 2/2006 |
| JP | 08198412 | 8/1996 |
| JP | 3102245 | 9/2006 |
| WO | 2005056943 | 6/2005 |
| WO | 2006095047 | 9/2006 |
| WO | 2007011814 | 1/2007 |
| WO | 2007083085 | 7/2007 |

OTHER PUBLICATIONS

Martin Hosek, "Observer-Corrector Control Design for Robots With Destabilizing Unmodeled Dynamics," IEEE, pp. 151-164, Jun. 2003, IEEE/ASME Transactions on Mechatronics, vol. 8, No. 2.

Martin Hosek, et al, "Brooks Automation Expands Control Capability of Precision Industrial Robots," MCB UP Limited, pp. 334-348, 2002, Industrial Robot: An International Journal, vol. 29, No. 4.

Martin Hosek, et al, "Substrate Centering Method for Robotized Semiconductor Manufacturing Systems," ASME, pp. 1-12, Nov. 2003, Proceedings of IMECE'03.

Stratos Ioannidis, et al, "Fuzzy Supervisory Control of Manufacturing Systems," IEEE, pp. 379-389, Jun. 2004, IEEE Transactions on Robotics and Automation, vol. 20, No. 3.

Jario Moura, "Neural Network Based Perturbation Identification Approach for High Accuracy Tracking Control of Robotic Manipulators," ASME, pp. 1-9, Nov. 2003, Proceedings of IMECE'03.

J.Z. Pan, et al, "Reconfigurable Distributed Real-Time Processing for Multi-Robot Control: Design, Implementation and Experimentation," Cambridge University Press, pp. 661-679, Feb. 2004, Robotica (2004) vol. 22.

International Search Report, International Application No. PCT/US2014/032368, dated Mar. 16, 2015.

(56) References Cited

OTHER PUBLICATIONS

European Supplemental Search Report, European Application No. 14727102, dated Oct. 3, 2016.

* cited by examiner

| GROUP NUMBER | SCORE RANGE | INTERPRETATION |
|---|---|---|
| 1 | 1 ⬅ MAX | INTERPRETATION A |
| 2 | 2 | INTERPRETATION B |
| 3 | 3 | INTERPRETATION C |
| 4 | 4 | INTERPRETATION D |
| ... | ... | ... |
| n | n ➡ MIN | INTERPRETATION n |

FIG. 3

| STORAGE LEVEL | STORAGE BAY 1 | STORAGE BAY 2 | STORAGE BAY n |
|---|---|---|---|
| 1 | 6 6 5 5 4 4 | 9 8 7 6 | ... ... |
| 2 | 7 7 6 5 5 | 8 8 8 8 6 | ... ... |
| 3 | 8 8 7 7 6 | 7 7 6 6 4 | ... ... |
| 4 | 7 7 6 6 4 | 8 7 6 5 4 | ... ... |
| 5 | 9 8 7 6 | 7 7 6 5 5 | ... ... |
| 6 | 8 8 8 6 4 4 | 6 6 5 5 4 4 | ... ... |
| 7 | 8 7 6 5 4 | 8 8 6 6 4 4 | ... ... |
| 8 | 8 8 8 8 6 | 8 8 7 7 | ... ... |
| ... | ... ... | ... ... | ... ... |
| n | d1 d2 d3 ... | d1 d2 d3 ... | ... ... |

FIG.4

AUTOMATED STORAGE AND RETRIEVAL SYSTEM AND CONTROL SYSTEM THEREOF

CROSS-REFERENCE TO RELATED APPLICATIONS

This application is a continuation of U.S. Non-provisional patent application Ser. No. 15/677,309, filed Aug. 15, 2017 (now U.S. Pat. No. 10,120,370), which is a continuation of U.S. Non-provisional patent application Ser. No. 14/229,004, filed Mar. 28, 2014 (now U.S. Pat. No. 9,733,638), which claims priority from and the benefit of U.S. Provisional Patent Application No. 61/809,188 filed on Apr. 5, 2013, the disclosures of which are incorporated herein by reference in their entireties.

BACKGROUND

1. Field

The one or more aspects of the exemplary embodiment generally relate to automated storage and retrieval systems for warehouses and stores.

2. Brief Description of Related Developments

Automated storage and retrieval systems are desired such as for warehouses and stores because of the potential and imagined efficiencies that such systems present. Examples of such systems include storage structure that define one or more levels of storage, locations and automated transport systems (such as carts, fork lifts, other independent automated vehicles or rovers, elevators, linearly continuous transport devices such as conveyors, roller beds, etc.) distributed or disposed to transport store units to and from store locations throughout the storage array. Realization of the efficiency potential presented by such systems may at times involve disparate factors that may act to mitigate the potential benefits of other factors. For example, dynamic allocation of storage locations in the array, with appropriate dynamic distribution of autonomous independent vehicles or rovers capable of effecting store unit placement in accordance with such allocation may provide for increased efficiencies in storage throughput. Similarly, greater transport speeds and freedom of movement of rovers may provide increased efficiency, and greater density of storage locations from having more storage levels or more closely spaced levels, or rack aisles may provide improved storage efficiency of the storage space. As may be realized upon further consideration certain manipulation or actions to optimize efficiencies of some factors may be in opposite or detract from optimal efficiencies of other factors resulting an overall efficiency of the ASRS that is minimally improved (if at all) despite significant efficiency gains in one factor or another. Overall efficiency of the ASRS, which may be considered generally to include factors dealing with how efficiently store units can be stored in the storage space (and may be thought to represent cost of storing a store unit in the ASRS and otherwise referred to as storage space efficiency) and factors dealing with how efficiently the store units may be moved, such as by the automated transport system, into the storage space, though the storage space to and from storage locations, in the storage space, and back out from the storage space (which may be thought of as representing the cost of moving a store unit in the ASRS, and referred to as transport efficiency). An ASRS with an improved control system that maximizes both storage space efficiency and transport efficiency is desired.

BRIEF DESCRIPTION OF THE DRAWINGS

The foregoing aspects and other features of the disclosed embodiment are explained in the following description, taken in connection with the accompanying drawings, wherein:

FIG. 3 is a chart illustrating the grouping of storage locations and/or store units in accordance with aspects of the disclosed embodiment;

FIG. 4 is a chart illustrating an exemplary storage allocation in accordance with aspects of the disclosed embodiment;

DETAILED DESCRIPTION

Figure 1:
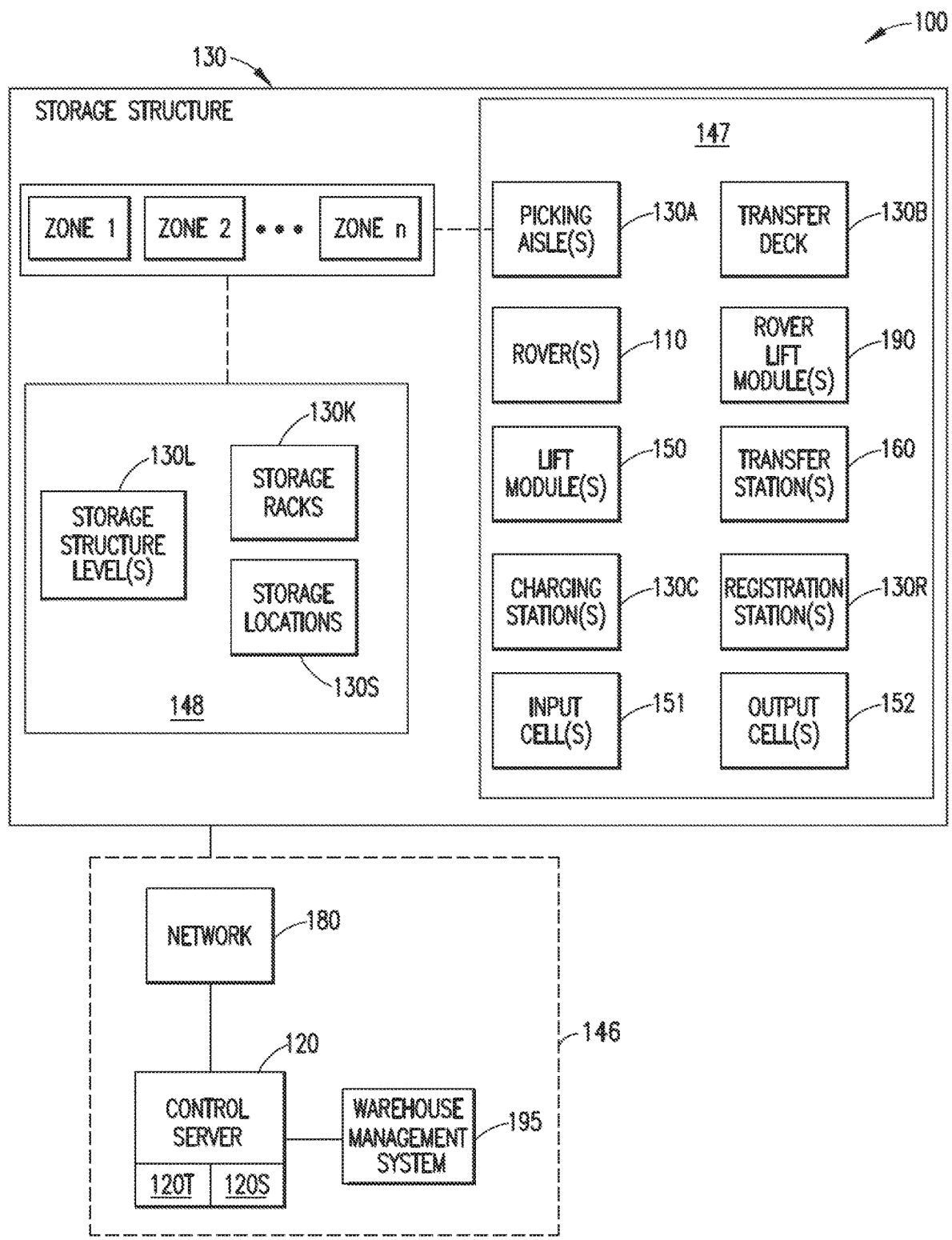
FIG. 1 is a schematic illustration of a storage and retrieval system in accordance with aspects of the disclosed embodiment.

FIG. 1 is a schematic illustration of an automated storage and retrieval system in accordance with aspects of the disclosed embodiment. Although the aspects of the disclosed embodiment will be described with reference to the drawings, it should be understood that the aspects of the disclosed embodiment can be embodied in many forms. In addition, any suitable size, shape or type of elements or materials could be used.

In accordance with aspects of the disclosed embodiment the automated storage and retrieval system (ASRS) 100 may operate in a retail distribution center or warehouse to, for example, fulfill orders received from retail stores for store units (where store units as used herein may include items not stored in trays, on totes or on pallets, and uncontained items stored in trays, totes or on pallets as well). It is noted that the store units may include cases of items (e.g. cases of soup cans, boxes of cereal, etc.) or individual items that are adapted to be taken off or placed on a pallet or otherwise shipped independently. Thus, store units may be referred to herein as store units or payload units. In accordance with aspects of the disclosed embodiment, shipping cases or store units (e.g. cartons barrels, boxes, crates, jugs, totes, pallets or any other suitable device for holding store units) may have variable sizes and may be used to hold items in shipping and may be configured so they are capable of being palletized for shipping or shipped independently in bulk shipping containers. It is noted that when, for example, bundles or pallets of store units arrive at the storage and retrieval system 100, the content of each pallet may be uniform (e.g. each pallet holds a predetermined number of the same item—one pallet holds soup an another pallet holds cereal) and as pallets leave the storage and retrieval system the pallets may contain any suitable number and combination of different items (e.g. each pallet may hold different types of items—a pallet holds a combination of soup and cereal). The aspects of the disclosed embodiment may be applied to any environment in which store units are stored and retrieved. As noted above, the store units may vary in size. However, each store unit may be considered dimensionally as corresponding with a nominal or otherwise normalized unit of measure. The nominal unit of measure may allow for placement of the store units to be placed in storage spaces as will be described in greater detail below.

Referring still to FIG. 1, the automated storage and retrieval system (ASRS) 100 may be considered conceptually to generally comprise a storage space (or storage portion) 148, a transport system (otherwise referred to herein for description purposes as a storage and retrieval transport system 147) and a control portion or system 146. As may be realized, the storage space (which may be configured in any suitable manner is disposed to define storage locations where store units may be stored by the ASRS as will be described further herein. In one aspect of the exemplary embodiment, the storage space configuration may include structure that defines undeterministic support surfaces for the store units, so that storage locations and/or storage spaces associated with storage locations may be varied, if desired. Thus, the location, in the storage space, that may be allocated to any (and each) store unit of any size, may be varied as desired, and such variability of location, and hence storage location allocation may be dynamically effected. In other aspects of the exemplary embodiment, the storage structure may provide deterministic (e.g. engagement) features that may define a predetermine storage location for some store units. As may be further realized, the transport system 147 may be distributed in, through and/or around the storage space 148 and provide the transport medium for store units to be input into, transported through the storage space for storage in corresponding storage locations, retrieval from the storage locations, and finally output from the ASRS (such as in response to an order). The transport system 147 may thus be considered an engine for storage and retrieval of store units in and from the storage space. As will be described further below, the transport system (also referred to as storage and retrieval engine) 147 may include discontinuous transport elements or variable transport elements (e.g. independent automated vehicles) so that order, origin, destination, and rate of different store units in the transport system may be independently varied as desired. Control and management of the placement (e.g. storage location allocation, or storage of store units) and retrieval of store units from storage locations in the storage space (e.g. it is from the storage locations that the store units are being retrieved), and flow of store units via the transport system are controlled by the control system 146. In other words, the control system 146 plans resolution of store units into storage locations of the storage space, and plans resolution of transport of the store units with the transport system from input or loading stations of the ASRS to storage locations (e.g. storage), and plans resolution of transport of the store units from the storage locations to output or unloading stations of the ASRS (e.g. retrieval). It is noted that the terms "storage" and "stored" may be used herein to refer to store units being situated or disposed in storage locations and "retrieval" or "retrieved" may be used herein to refer to store units being removed from the storage locations, and the term "storage and retrieval engine" may be used herein to refer to the transport system 147 effecting storage and retrieval. The two aforementioned aspects (i.e. resolution of store units into storage locations or resolution of storage and retrieval, and resolution of store unit transport for storage and retrieval in the storage space or resolution of the store units in the storage and retrieval engine) may be considered to define principal parts, e.g. the "where" and "how", of throughput of store units by the ASRS. By way of further explanation, throughput performance for a given storage space (which may represent part of or the entire storage space 148 of the ASRS) of the ASRS may be considered to be how efficiently store units are stored and retrieved in the given storage space and how efficiently store units are transported by the storage and retrieval engine 147 effecting storage and retrieval in that storage space. Accordingly, the resolution of storage and retrieval system (SRS) for a given storage space and resolution of the storage and retrieval engine 147 communicating with the given storage space 148 determine in combination the throughput performance of the given storage space (which, as noted above, may represent part of or the entire storage space 148 of the ASRS). Thus as may be readily determined, the control system 146 is configured to manage the throughput performance of the ASRS by planning and control of the storage and retrieval of store units and planning and control of the storage and retrieval engine 147 as will be described in further detail below.

In accordance with an aspect of the exemplary embodiment, planning and control of the storage and retrieval of store units and/or planning and control of the storage and retrieval engine 147 may be effected independently of the other. Thus, by way of example, planning and control of the storage and retrieval system may be performed independent of the planning and control of the storage and retrieval engine 147 as will be further described. More specifically, the conditions, parameters and considerations employed by the control system 146 processors as the basis to effect planning and control of the storage and retrieval system (e.g. resolving store units into storage locations of the storage space) may be independent or decoupled from considerations, parameters and conditions forming the basis of planning and control of the storage and retrieval engine 147. In accordance with other aspects of the exemplary embodiment, this may be reversed. Referring still to FIG. 1, the control server 120 may include any suitable number of processors (e.g. controllers or control portions 120S, 120T) to effect planning and control of the storage and retrieval system and of the storage and retrieval engine 147. In accordance with an aspect of the exemplary embodiment, the control server processor(s) may be configured to provide separate controllers or control portions 120S, 120T respectively managing and controlling the storage and retrieval system and the storage and retrieval engine 147. In one aspect, the control portions 120S, 120T may be separate and distinct (e.g. with separate and distinct processors corresponding to each section). In other aspects, the separate control portions 120S, 120T may share some processors though planning and control by the corresponding control portion of the storage and retrieval system and the storage and retrieval engine 147 may nonetheless be performed separately and independently as previously described and as will be described further herein.

The automated storage and retrieval system (ASRS) 100 may include a control system 146 for managing storage in a storage space, such as storage space 148, and throughput performance for that storage space 148. The control system 146 may include more than one independent control part where, e.g., a first control part (e.g. control portion 120T also referred to herein as PNC controller 120T) may be configured to control at least transport of store units (e.g. payload(s)) and a second control part (e.g. control portion 120S also referred to herein as SRS control portion 120S) may be configured to effect placement of store units in the storage space 148. At least one of the first and second control parts 120T, 120S may be decoupled from the other first and second control part 120T, 120S so that information from at least the first or second control part 120T, 120S is generally defined as an independent controller that produces output information that is independent of output information from the other of the first or second control parts 120T, 120S. Output information from the other of first or second control parts 120T, 120S is based at least in part on the output information from the at least one of the first and second control parts 120T, 120S.

Figure 1A:
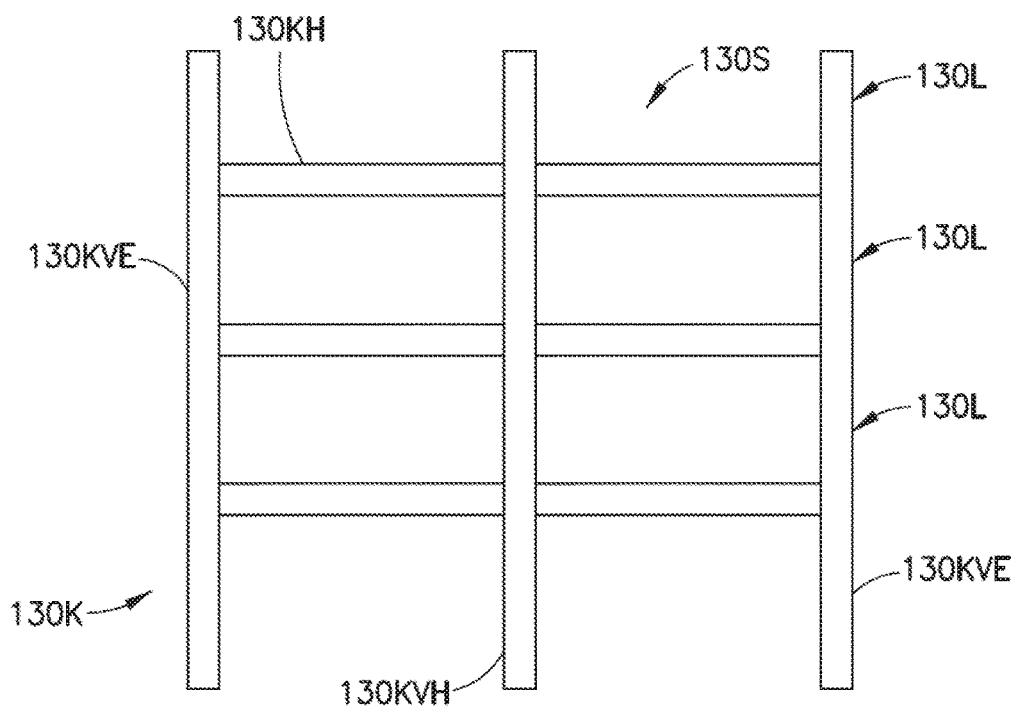
FIG. 1A is a schematic illustration of a portion of the storage and retrieval system of FIG. 1 in accordance with aspects of the disclosed embodiment.

As noted above, the automated storage and retrieval system (ASRS) 100 may include a control system 146 (which will be described in greater detail below) and a storage structure 130. The storage structure 130 may include a storage portion or storage space 148 and a transport system that, as noted above, may be referred to as a storage and retrieval engine (SRE) 147. Referring also to FIG. 1A the storage space 148 may include multiple storage levels 130L that include storage rack modules 130K that provide storage locations 130S at each storage level 130L. In one aspect the storage rack modules 130K may be substantially similar to those described in U.S. patent application Ser. No. 12/757,220 filed on Apr. 9, 2010 the disclosure of which is incorporated by reference herein in its entirety. In one aspect a single level of storage locations 130S may be provided at and accessed from each storage level 130L (e.g. one picking aisle deck per storage space level) while in other aspects at least one of the storage levels 130L may have may have access to more than one level of storage locations 130S (e.g. one picking aisle deck per multiple levels of storage spaces). Each of the storage rack modules 130K may have a frame formed by vertical supports 130KVE, 130KVH and horizontal supports 130KH coupled to the vertical supports. Storage shelves may be fastened to or otherwise affixed to the horizontal supports 130KH and be configured to support any suitable number of store units and/or pickfaces formed by the store units. In one aspect, the storage locations 130S on one level of storage spaces in which the store units are placed may include sectioned groups of one or more storage spaces (e.g. storage bays) in that each storage space may have horizontal boundaries formed by one end vertical supports 130KVE and one intermediate vertical support 130KVH or horizontal boundaries formed by two intermediate vertical supports 130KVH. In other aspects, the storage locations 130S on one level of storage locations may be formed by a substantially continuous storage space that spans between the ends of the storage rack module 130K (e.g. between end vertical supports 130KVE and free from boundaries formed by any intermediate vertical supports 130KVH). In still other aspects a length or size the storage locations 130S may be apportioned on each level of storage spaces in any suitable manner.

The term "storage and retrieval engine" 147 as used herein may refer to the mechanism that facilitates the introduction and removal of store units to and from the storage and retrieval system 100 and/or moves the store units within the storage space 148 or at least a portion of the storage space 148. In one aspect the storage and retrieval engine 147 includes one or more input cells 151, one or more output cells 152, one or more in-feed and/or out-feed transfer stations 160, input and/or output vertical lift modules 150, rover lift modules 190, autonomous rovers 110, picking aisles 130A and transfer decks 130B. In other aspects the storage and retrieval engine 147 may have any suitable configuration with may include one or more of the input cells 151, output cells 152, in-feed and/or out-feed transfer stations 160, input and/or output vertical lift modules 150, rover lift modules 190, autonomous rovers 110, picking aisles 130A and transfer decks 130B. The one or more input cells 151 and one or more output cells 152 may be any suitable loading/unloading cells allowing store units to be generally input to and output from the ASRS 100 either manually or through an automated system. Store units may be transferred to or from for example, pallets or other shipping container/platform within the one or more input cells 151 and one or more output cells 152. The one or more input cells 151 and the one or more output cells 152 may include any suitable conveyor or transport for transporting store units to or from, for example, a vertical lift module 150 while in other aspects the store units may be placed substantially directly on one or more of the vertical lift modules. It is noted that in one aspect a single cell 151, 152 may be used to both input and output store units to and from the ASRS 100. The transfer stations 160 may be dedicated input transfer stations, dedicated output transfer stations and/or one or more transfer stations may be configured for both the input and output of store units. Each transfer station 160 may include any suitable palletizer and/or de-palletizer and any suitable conveyor and in one aspect may be part of a respective input cell 151 or output cell 152. The de-palletizer may remove store units from pallets and place the store units on the respective conveyor for transport to a lift module 150. In other aspects the de-palletizer may transport the store units from the pallet to the lift module 150. The palletizer may remove store units from a respective conveyor transporting store units from a lift module 150 and place the store units on a pallet in a predetermined manner for shipment according to a customer order. In other aspects the palletizer may transport the store units from the lift module to the pallet. As may be realized the store units may be transferred between the lift modules 150 and the transfer station conveyors in any suitable manner. The lift modules 150 may be any suitable vertical lift modules configured for transporting store units from the transfer station conveyors to a predetermined storage level 130L.

The transfer decks 130B and picking aisles 130A may be connected to each other to form the different storage levels 130L such that one transfer deck 130B provides rover 110 access to at least one picking aisle 130A on a respective storage level 130L. The transfer decks 130B may also be connected to the lift modules 150 (e.g. for providing rover 110 access to the lift modules 150 for transferring store units between the rovers 110 and the lift modules 150 in any suitable manner) and/or the rover lift module(s) 190 (e.g. for allowing rovers 110 to be input or removed from each storage level 130L via the rover lift module 190). The picking aisles 130A may be connected in any suitable manner to, for example, the storage rack modules 130K to provide rover 110 access to one or more levels of the storage locations 130S. The picking aisles 130A may be configured to allow the rovers 110 to traverse the picking aisles 130A and transition between the picking aisles 130A and respective transfer deck 130B in any suitable manner. Suitable examples of the storage and retrieval system structure noted above can be found in, for example, United States patent applications having entitled "Automated Storage and Retrieval System" (U.S. patent application Ser. No. 14/215, 310) filed on Mar. 17, 2014; entitled "Storage and Retrieval System Rover Interface" (U.S. patent application Ser. No. 14/229,004) filed on Mar. 28, 2014; and entitled "Automated Storage and Retrieval System Structure" (U.S. patent application Ser. No. 14/209,209) filed on Mar. 13, 2014, the disclosures of which are incorporated herein by reference in their entireties.

The rovers 110 may be any suitable autonomous vehicles capable of carrying and transferring store units along the transfer decks 130B and picking aisles 130A. In one aspect the rovers 110 may be automated, independent (e.g. free riding) rovers. Suitable examples of rovers can be found in, for exemplary purposes only, U.S. patent application Ser. No. 13/326,674 filed on Dec. 15, 2011; U.S. patent application Ser. No. 12/757,312 filed on Apr. 9, 2010; U.S. patent application Ser. No. 13/326,423 filed on Dec. 15, 2011; U.S. patent application Ser. No. 13/326,447 filed on Dec. 15, 2011; U.S. patent application Ser. No. 13/326,505 Dec. 15, 2011; U.S. patent application Ser. No. 13/327,040 filed on Dec. 15, 2011; U.S. patent application Ser. No. 13/326,952 filed on Dec. 15, 2011; and U.S. patent application Ser. No. 13/326,993 filed on Dec. 15, 2011, the disclosures of which are incorporated by reference herein in their entireties. The rovers 110 may be configured to place store units, such as the above described retail merchandise, into picking stock in the one or more levels of the storage structure 130 and then selectively retrieve ordered store units for shipping the ordered store units to, for example, a store or other suitable location.

The rovers 110, vertical lift modules 150, rover lift modules 190, the one or more input/output cells 151, 152, transfer stations 160 and other suitable features of the storage and retrieval system 100 may be controlled by, for example, one or more central system control computers, such as control server 120, (which will be described in greater detail below) through, for example, any suitable network 180. The network 180 may be a wired network, a wireless network or a combination of a wireless and wired network using any suitable type and/or number of communication protocols. In one aspect, the control server 120 may include a collection of substantially concurrently running programs (e.g. system management software) for substantially automatic control of the automated storage and retrieval system 100. The collection of substantially concurrently running programs may be configured to manage the storage and retrieval system 100 including, for exemplary purposes only, controlling, scheduling, and monitoring the activities of all active system components, managing inventory (e.g. which store units are input and removed and where the store units are stored) and pickfaces (e.g. one or more store units that are movable as a unit), and interfacing with the warehouse management system 195.

In one aspect the ASRS 100 may be divided into any suitable number of zones, e.g., Zone 1, Zone 2 . . . Zone n where each zone may include any desired portion of storage space 148 and/or a desired portion of the storage and retrieval engine 147. The desired portion of the storage space 148 may include all or a portion of a storage structure level 130L and the corresponding storage racks 130K and storage locations 130S located on that storage structure level 130L or the portion thereof. In other aspects the desired portion of the storage space 148 may include multiple storage levels 130L or portions of multiple storage levels and the corresponding storage racks 130K and storage locations 130S. The desired portion of the storage and retrieval engine 147 may include one or more of picking aisles 130A (or a portion thereof), transfer deck 130B (or a portion thereof), rover lift modules 190, lift modules 150, transfer stations 160, charging stations 130C, registration stations 130R, input cells 151 and output cells 152. The rovers 110 may be capable of traversing between the zones Zone 1, Zone 2 . . . Zone n so that store units can be picked or placed in any one of the zones Zone 1, Zone 2 . . . Zone n by a rover 110 that is common to the one or more zones Zone 1, Zone 2 . . . Zone n. In other aspects each zone Zone 1, Zone 2 . . . Zone n may have dedicated rovers 110 that are substantially confined within a respective zone Zone 1, Zone 2 . . . Zone n. The different zones may allow for the storage of store units within the ASRS 100 in a distributed manner and provide redundant access to store units as will be described in greater detail below. Suitable examples of zones can be found in, for example, U.S. patent application Ser. No. 13/326,565, filed Dec. 15, 2011, and U.S. Provisional Patent Application Ser. No. 61/794,065, filed on Mar. 15, 2013, the disclosures of which are incorporated by reference herein in their entireties.

Figure 2:
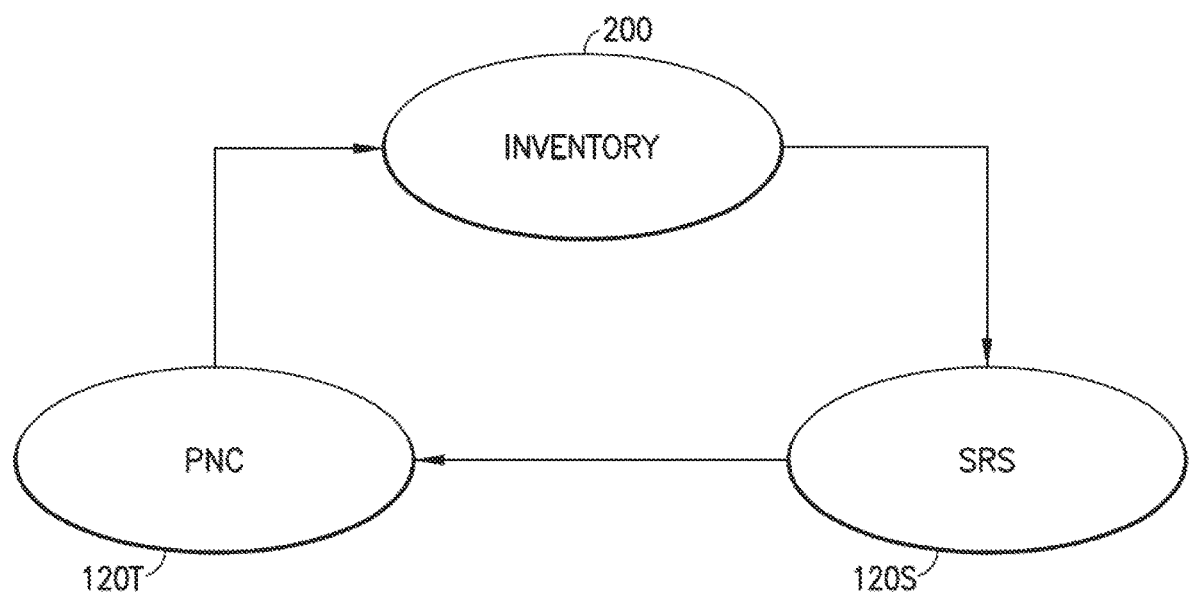
FIG. 2 is a schematic illustration of a control system of the storage and retrieval system of FIG. 1 in accordance with aspects of the disclosed embodiment.

Referring also to FIG. 2, in one aspect the system control server 120 may include a storage and retrieval (SRS) control portion 120S, also referred to as SRS control portion 120S, and a planning and control portion (PNC) 120T, also referred to as PNC controller 120T, for the storage and retrieval engine 147. The storage and retrieval (SRS) control portion 120S may be configured to drive or control the storage arrangement of the storage space 148 (also referred to herein as storage and retrieval system) for achieving and maintaining optimal distribution of the inventory 200 within the storage space 148. As noted before, the storage and retrieval (SRS) control portion 120S may drive the storage and retrieval system substantially independent of constraints and considerations related to the plan and control of the storage and retrieval engine 147, such as for example, rover 110 paths or other store unit transportation and/or input/output factors. The result in effect, is to decouple storage efficiency from transport efficiency. In one aspect at least one of the storage and retrieval control portion 120S and the planning and control portion 120T may operate independent from the other one of the storage and retrieval control portion 120S and planning and control portion 120S. In other aspects the control portions 120S, 102T may operate together or otherwise cooperate in any suitable manner. The storage and retrieval control portion 120S may, in one aspect, be considered to advise, provide suggestions or input information that form a basis to the planning and control portion 120T and may enable planning resolution, by the planning and control portion (PNC) 120T, of the storage and retrieval system and hence of the throughput performance of the ASRS 100 as will be described in greater detail below. The information output from the storage and retrieval control portion 120S to the planning and control portion (PNC) 120T may represent or otherwise embody storage efficiency for various storage locations 130S as located with given incoming and/or outgoing store units (e.g. for each incoming/outgoing stock keeping unit or SKU). By way of example, the storage and retrieval (SRS) control portion 120S may provide to the planning and control portion 120T, e.g. for each SKU item, a list of selectable storage location 130S options, that may be weighted or otherwise scored for storage space efficiency. The planning and control portion (PNC) 120T may, for its part, choose from the selectable storage locations 130S (received from the SRS control portion 120S) when assigning tasks to the components of the storage and retrieval engine 147, such as rovers 110 as will be described in greater detail below.

The SRS control portion 120S may be programmed with suitable rules that operate to evaluate and resolve storage and retrieval (e.g. location to fill and empty) within the storage space 148 based on factors that are independent of resolution or plan and control of the storage and retrieval engine 147. Referring to FIG. 3 there is shown in tabular form, an optimization range or distribution that represents the resolution provided by the SRS control portion 120S for the storage and retrieval system. The SRS control portion 120S may evaluate the optimization of each location to be filled or emptied, assigning it a value or score within the range 302, which has a corresponding meaning or interpretation 303 for further plan and control. The locations to fill and empty (e.g. store units to pick) within the storage space 148 may be evaluated using one or more suitable factors which may be referred to, for exemplary purposes as store and space factors. These store and space factors may be used for both storage location 130S (e.g. store location) allocation on inbound store units and storage location allocation on outbound store units (e.g. ordered store units). The store and space factors may each be considered/evaluated independently of each other or in any desired combination(s), for efficiency of storage location(s) with respect to the store and space factors. It is noted that the factors considered may be static (e.g. they do not change) or they may be dynamic (e.g. the factors may change depending on for example, predetermined circumstances or rules). The efficiencies may be combined for a total storage space efficiency per location of a desired store unit or multiple store units. In one aspect the store and space factors may include density of store units, redundancy of store units, throughput (slow/fast moving store units), expiration of store units, fragmentation of storage locations/store units, weight of store units, customer/business rules and/or any other suitable factors. The redundancy of store units noted above may refer to the placement of store units within the ASRS 100 so that the same type of store unit is stored in different locations and/or storage zones, such as Zone 1, Zone 2, Zone n as shown in FIG. 1, of the ASRS 100 so that if access to a predetermined store unit at one location/zone is blocked or the predetermined store unit is otherwise inaccessible another store unit of the same type may be retrieved from a different accessible location/zone. It is noted that where the operation of the storage and retrieval control portion 120S is independent of the planning and control portion 120T these factors and any analysis related thereto may be hidden from the planning and control portion 120T.

Each storage location 130S and/or the store units located in the storage locations 130S may be placed in groups 301 based on where each storage location 130S and/or store unit is ranked within an optimization range 302. The range 302 may be based on one or more of the above-described factors and range between a maximum score and a minimum score (e.g. between 1 and 0, otherwise normalized values representing best efficiency and worst efficiency) having a generally continuous range from the maximum score to the minimum score (e.g. a gapless (i.e. without gaps) full spectrum range). Where the scores are based on more than one factor a score may be generated for each of the factors and then combined in any suitable manner such as, for example, using a heuristic where the combined score is associated with a group number associated with the score. The score range 302 may include any suitable type of ranking system (e.g. numeric, alphabetical, alphanumeric, fractional, decimal, etc.) capable of embodying and relating the score as output information of the SRS control portion 120S. As may be realized, in one aspect, the higher the ranking the more desirable the use of that storage location 130S and/or store unit. The group numbers and scores for each storage location 130S and/or store unit may be communicated to the planning and control portion 120T in any suitable manner for interpretation and used for resolving the storage and retrieval engine 147 effecting addition and/or removal of store units from the ASRS 100. In one aspect, illustrated in FIG. 3, the range may be divided into discrete segments or groups, where the optimization values may vary between high and low bounds for that segment, but share a common planning and control meaning 303. For exemplary purposes only, group number 1 having score range 1 may be interpreted (e.g. "Interpretation A") by the planning and control portion 120T so that the locations or store units included in group number 1 are used first, if at all possible. Group number 2 having score range 2 may be interpreted (e.g. "Interpretation B") by the planning and control portion 120T so that the locations or store units included in group number 2 are used at will as all the storage locations/store units are all pretty good. Group number 3 having score range 3 may be interpreted (e.g. "Interpretation C") by the planning and control portion 120T so that the locations or store units included in group number 2 are used if there are not enough storage spaces/store units in group number 2. The desired use of the storage locations and/or store units may decrease as the score range moves towards the minimum value such that, for example, group number n having score range n may be interpreted (e.g. "Interpretation n") by the planning and control portion 120T so that the locations or store units included in group number n are avoided if at all possible.

As noted before, one of the optimization factors considered by the SRS control portion 120S may be fragmentation of the storage locations which represents the relationship of a storage location (or desired characteristics thereof, such as size, type of store unit to be stored therein, etc.) to neighboring storage locations (or comparable characteristics thereof). Optimization of the fragmentation factor drives disposition of storage and retrieval to prevent remote clusters of storage locations. Referring to FIG. 4, placement of inbound store units into storage locations 130S may be a dynamic process, and in order to assist in fragmentation factorization, the storage space 148 (whether, e.g., linear (1 dimensional) such as along a picking aisle, two dimensional such as on a storage level, or three dimensional such as on multiple storage levels) may be resolved into predetermined sized locations that may be variably distributed along the storage rack modules 130K. Each storage location 130S may be capable of accepting store units that are equal to or less than the predetermined size of the storage location 130S. For example, each of the storage locations 130S scored by the storage and retrieval control portion 120S may have a pre-assigned storage size on a respective level of the storage rack modules 130K. The storage locations 130S having pre-assigned sizes may be matched to expected store unit distribution and optimally fill each storage bay (or substantially continuous storage space as described above). The assignment of the storage space sizes may account for one or more (e.g. both) of density of storage and fragmentation of the storage locations 130S and/or store units. In one aspect a storage bay or other suitable shelf space may have any suitable size associated with it. In one aspect the size of the storage space (as well as the size of the pre-assigned storage locations) may have unitized or otherwise normalized units into which the storage space is broken. For exemplary purposes only with respect to the exemplary pre-assigned storage location sizes shown in FIG. 4, each storage bay may have a shelf size of 30 units. In other aspects each storage bay may be divided into any suitable number of units with respect to the shelf size. Each storage bay on each level may be subdivided in any suitable manner so that a sum of the combined storage location sizes is substantially equal to the shelf size. For example, referring to storage level 1 and storage bay 1 in FIG. 4, each number listed in the storage bay may represent a unit size of a respective storage location 130S. The unit sizes used in the storage bays for each storage location may correspond with the unitized sizes of the store units described above. The pre-assigned unit sizes of each storage location 130S within a storage bay (or other suitable storage space) may be determined in any suitable manner so as to obtain a predetermined storage density that lacks fragmentation. For example, fragmentation may occur when a large number of the same size or type of store units are bunched or otherwise located side by side in one or more bays so as to create segregated bunches of store units. While this arrangement of store units may result in a high storage density, this segregation of store units may cause a first type of store unit to be located such that a rover 110 travels a first distance to access the first type of store unit. This segregation may also cause a second type of store unit to be located such that the rover travels a second distance that is much farther than the first distance to access the second type of store unit. These widely segregated bunches of store units result in a fragmented and poorly distributed storage. The unit sizes in the storage bays are arranged so that different types and sizes of store units are distributed within the storage bays to avoid fragmentation and to avoid large empty spaces on the storage shelves. Referring again to storage bay 1 on storage level 1 in FIG. 4, for example, storage bay 1 is divided into six storage locations 130S the largest of which has a size of 6 units. This means that a store unit having a size of 6 units or less can be placed in that storage location. As such, the most empty space that may result from placement of a store unit in that storage location would be the unit size of the storage minus 1 (e.g. the unit size of the smallest store unit).

In another aspect, the storage shelves may be considered as a substantially open continuum having variably located storage spaces. For example, placement of a first store unit in a storage bay may be such that the store unit is placed in a center of the storage bay dividing the storage bay into two remaining sections. Subsequent store units may be placed in the center of each of the remaining section further dividing those sections into an additional two sections and so forth dividing each remaining section in half until the remaining space is too small for additional store units to fit into. In still other aspects, the store units may be placed in the storage space 148 in any suitable manner to substantially prevent fragmentation and provide any suitable density of store units.

Figure 5:
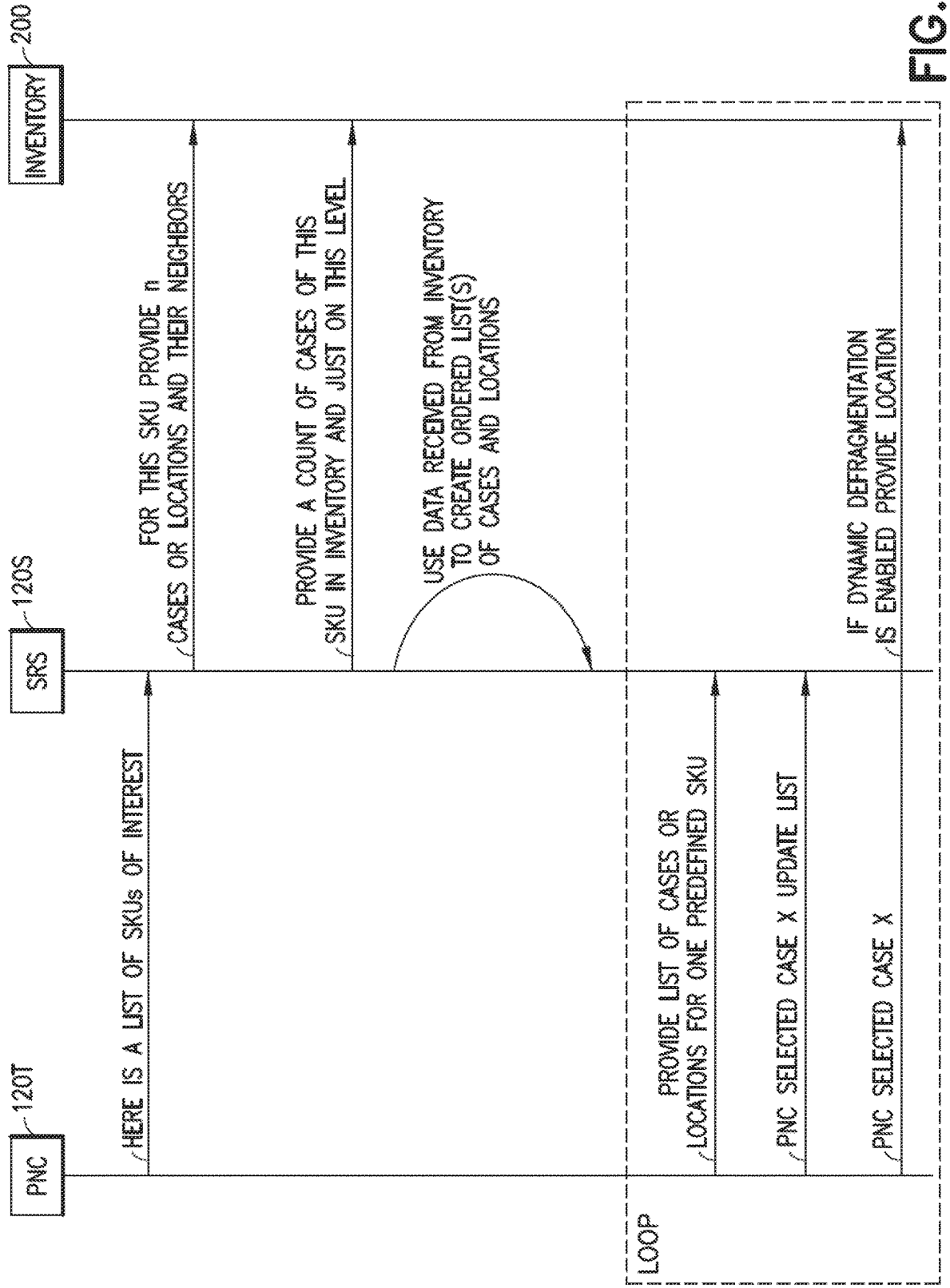
FIG. 5 is a schematic illustration of control communications in accordance with aspects of the disclosed embodiment.

As noted above, the storage and retrieval control portion 120S provides output information, defining selectable resolutions of the storage and retrieval system, to the planning and control portion (PNC) 120T that is used by the PNC controller, and in accordance with one aspect enables the PNC controller to resolve transport of the store units with the storage and retrieval engine. For example, an exemplary interaction between the storage and retrieval control portion 120S the planning and control portion 120T is shown in FIG. 5. Here the planning and control portion 120T provides a list to the storage and retrieval control portion 120S of selectable storage locations for store units that may be picked from a selected storage location 130S, placed at a selected storage location 130S or otherwise moved within the storage and retrieval system between selected storage locations. The storage and retrieval control portion 120S may then look up in inventory 200 the locations and numbers of the store units identified by the planning and control portion that already exist in the storage space 148 in general (e.g. all levels), in the storage space 148 on a predetermined storage level 130L or any other suitable information pertaining to the identified store units. The storage and retrieval control portion 120S may use this information obtained from the inventory 200 to create an ordered list of store units and for each store unit an ordered list of selectable locations corresponding thereto. This ordered list may be provided to the planning and control portion 120T so that the planning and control portion 120T may determine how the store units are going to be transferred to or removed from the storage locations 130S as will be described in greater detail below.

As noted before, and referring still to FIG. 5, the PNC controller 120T plans and controls the storage and retrieval engine 147 to effect transport of each of the store units on the ordered list to or from the selected storage location (corresponding to the given store unit) from the ordered list of selectable storage locations (for that store unit) provided by the SRS control portion 120S. These lists may be referred to as storage and retrieval lists. As also noted before, and shown in FIG. 5, the PNC controller 120T may plan and control the storage and retrieval engine 147 to effect transport of store units such as for repositioning and or relocating the store units in the storage space 148 also in accordance with lists of selectable storage locations generated by SRS control portion 120S and provided to the PNC controller 120T. Thus, in one aspect SRS control portion 120S may be suitably programmed to review optimization of the storage space 148 not only in response to storage and retrieval requests or activity, but also in intervening periods. This review may be dynamic, effected for example periodically, such as after one or more storage and/or retrieval actions, continuously or upon reaching a predetermined threshold or at any other suitable time. This optimization may be determined in a manner similar to that previously described for storage and retrieval system optimization, and the result is also an ordered list of store units (being repositioned in, rather than introduced or removed from the storage space), and for each store unit an ordered list of selectable storage locations may be provided by the SRS control portion 120S to the PNC controller 120T. The list which may be referred to as a reposition list may be provided by the SRS control portion 120S coincident with the storage and retrieval lists, or separately, and the corresponding transport plan and control by the PNC controller 120T may be effected as desired, though in a similar manner for all. In one aspect, as illustrated in the schematic of FIG. 5, initiation of the storage and retrieval plan and control may commence with the PNC controller 120T, such as upon receipt by any suitable controller, such as control server 120, of a suitable request such as an input or output order of the store units (that may be entered via a suitable interface, not shown). In other aspects, initiation may commence with any other one or more control portions as desired.

Referring now to FIGS. 3 and 5, in accordance with one aspect, the ordered list generated by the SRS control portion 120S, and input to the PNC controller 120T, may include (as noted before) more than one storage location that is selectable for each store unit in the ordered list. As may be realized, each selectable storage location for the given store unit may have a corresponding optimization or efficiency value (score) $302_{1-n}$ determined by the SRS control portion 120S as previously discussed, and the corresponding interpretation $303_{A-n}$ (which may be programmed in the PNC controller 120T or otherwise suitably communicated to the PNC controller 120T as desired). The optimization values corresponding to each selectable location on the list may be provided as information in the list and is used by PNC controller 120T to select the desired storage location from the selectable locations provided on the list, as will be described further below. As may also be realized, in one aspect, the SRS control portion 120S may determine selectable storage locations for each store unit that may have different optimization values $302_{1-n}$ (such as selectable locations having higher optimization and others having lower optimization), though under suitable conditions of the storage space, several of the selectable storage locations that have been determined may have similar optimization values (e.g. subject to a common interpretation). In accordance with an aspect, the SRS control portion 120S may determine the selectable storage location for a given store unit within a common zone (see FIG. 1) of the storage structure, though in other aspects, selectable locations may be distributed over more than one zone. As noted before, the PNC controller 120T may select the storage location, for each ordered store unit, from the selectable storage locations listed by the SRS control portion 120S for that store unit. Thus, the list of selectable storage locations (independently generated by and provided) from the SRS control portion 120S may be considered as an enabler or enabling the PNC controller 120T to effect planning and control of the throughput performance for the zone(s) and for the entire ASRS 100.

In accordance with an aspect of the disclosed embodiment, the PNC controller 120T may effect selection of the storage location for a given ordered store unit by comparing the optimization value of each of the selectable storage locations (for that store unit) with performance optimization or efficiency potential of the storage and retrieval system in effecting transport of the store unit to each of the selectable storage locations. The performance efficiencies of the storage and retrieval engine (SRE) 147 for the potential transport to each of the selectable storage locations may be estimated by the PNC controller 120T (with an integral processor or remotely) as will be described herein. The PNC controller 120T may then balance, weigh or otherwise combine the SRS optimization value for each selectable storage location against the performance efficiency potential for the transport to/from that storage location to identify the selectable storage location with the highest SRS optimization value and highest performance efficiency potential which may then be selected as the storage location. The PNC controller 120T may have suitable programming with preferences to effect selection in the event of a tie between selectable storage locations. As may be realized, the performance efficiency potential may be expressed as a numerical value or in any other suitable form to facilitate balancing or combination with the SRS optimization value. It may be realized, that the PNC controller 120T is configured to effect input and output performance via the storage and retrieval engine 147 that moves store units from origin to destination as quickly as possible (e.g. performance efficiency). The PNC controller 120T may estimate the performance efficiency potential (e.g. the highest performance efficiency of transport) for each of the selectable storage locations with any suitable state estimation system such as system models, neural networks and others.

Figure 6:
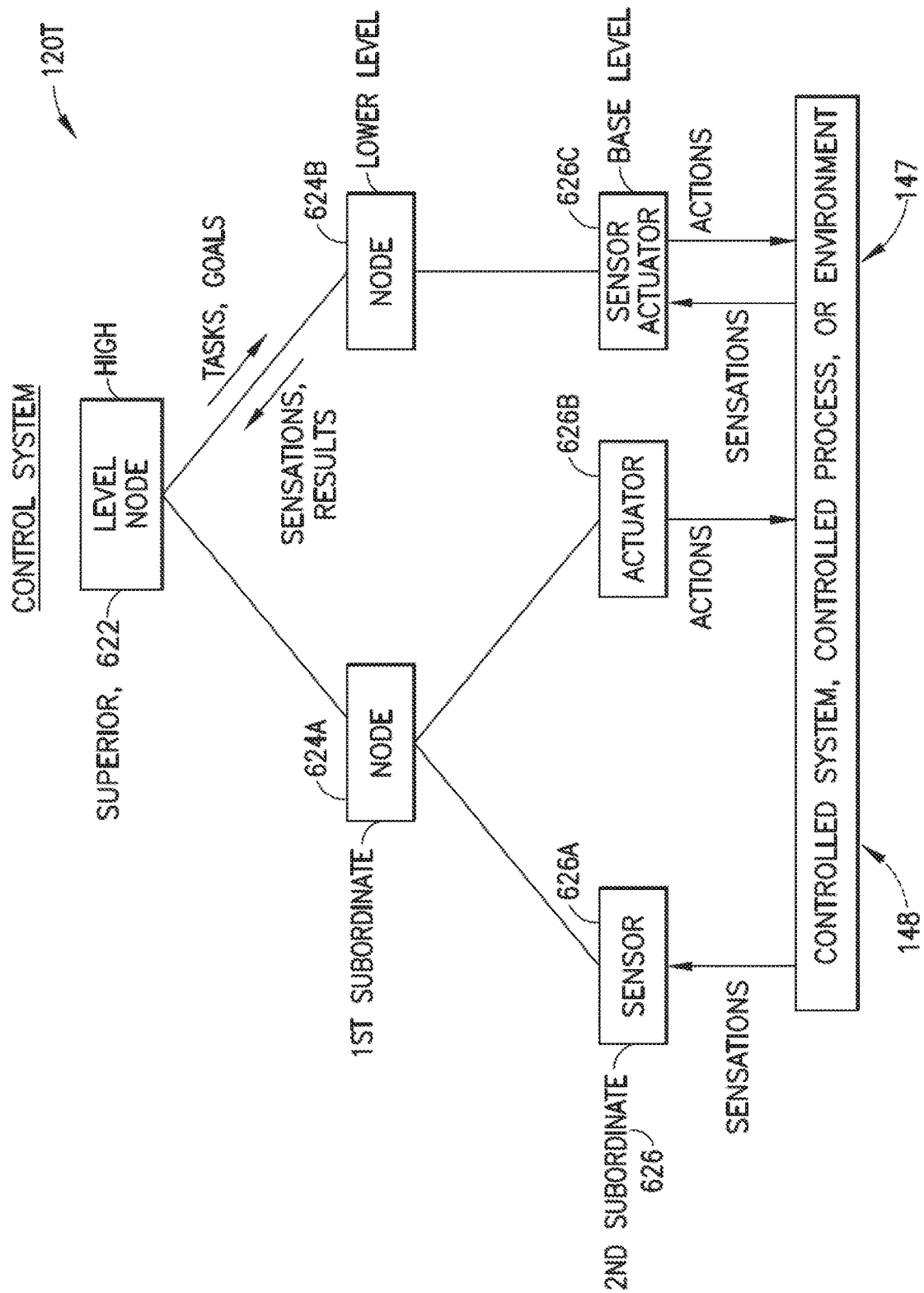
FIG. 6 is a schematic illustration of a portion of control system in accordance with aspects of the disclosed embodiment.
Figure 7:
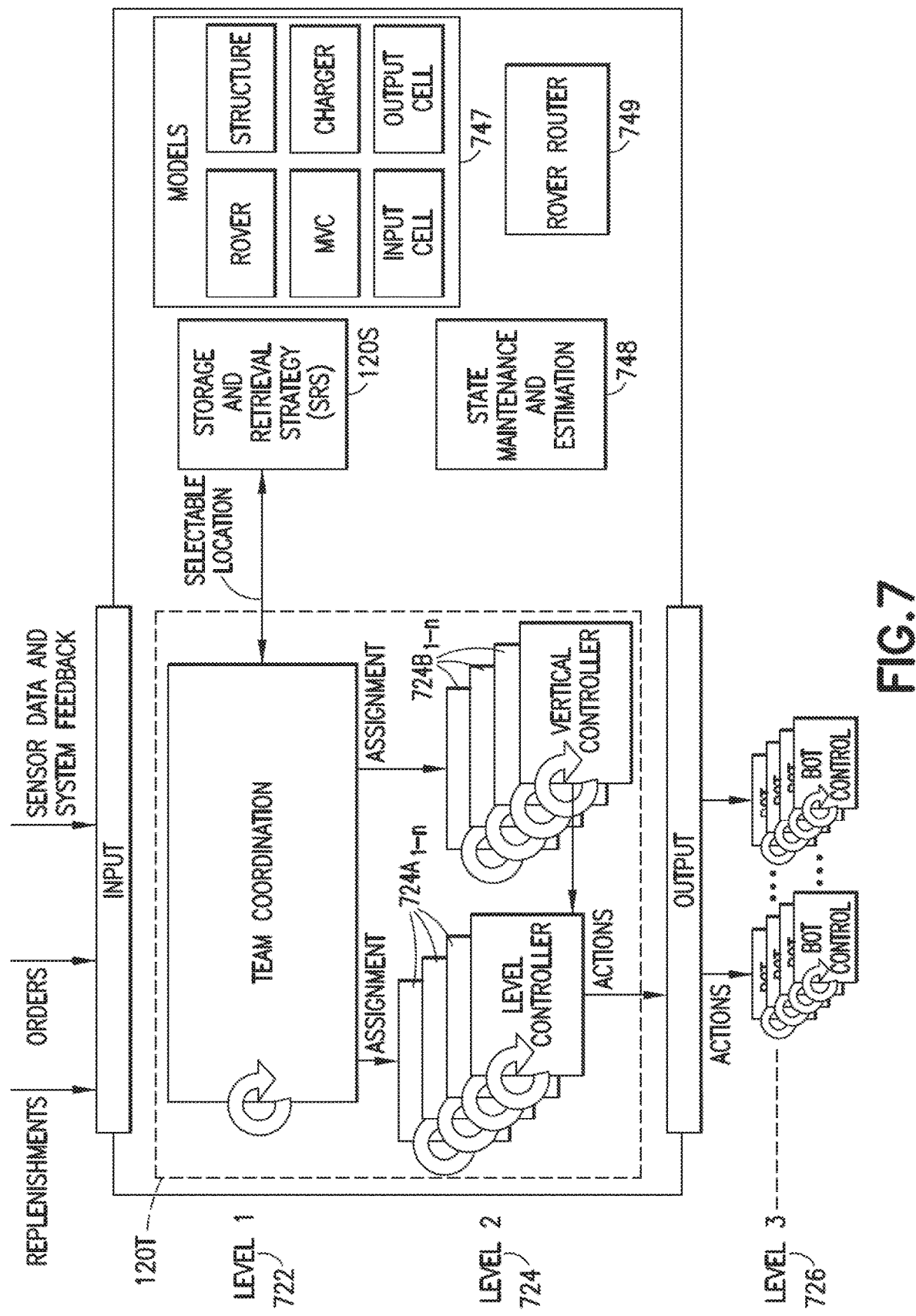
FIG. 7 is a schematic illustration of a portion of control system in accordance with aspects of the disclosed embodiment.

Referring now to FIGS. 6 and 7, which respectively show a schematic view of a PNC controller 120T, and another schematic view of the portion of the control system 146 (see also FIG. 1), the PNC controller 120T may be a distributed control system with a hierarchical architecture that is arranged to perform control plan resolution with increasing granularity or detail at progressively subordinate levels of the controller. As seen in FIG. 6, the PNC controller 120T may have multiple controller levels (e.g. superior or higher level 622, and a desired number of progressively subordinate levels 624, 626; the illustrated example shows two subordinate levels but in other aspects more or fewer subordinate levels may be provided). Each controller level may have one or more controllers or controller nodes. By way of example, each controller/node may be generating commands for subordinate controllers/nodes. Sensory data may be passed upwards through the hierarchy from leaf or base nodes 626A-626C that may be any suitable sensors and/or actuators. In one aspect, the high level controller 622 of the PNC controller 120T is programmed to determine the storage location for each store unit in the storage and retrieval order list, previously described, and assign the task of effecting transport of the given store unit with the storage and retrieval engine 147 to controllers on subordinate levels. Expressed another way, the high level controller is configured to generate high level tasks (that effect throughput performance) and amongst which are high level tasks that determine the storage location for each corresponding store unit throughput by the ASRS 100 and assign the high level tasks to one or more subordinate controllers to be carried out. The subordinate controllers 624A, 624B may be programmed for generating commands and/or instructions for subordinated controllers 626A, 626B from the tasks assigned, so that the subordinated controllers 626A, 626B may effect control, such as, of transport automation components (e.g. rover controllers and sensors, lift module actuators and sensors, etc.) and perform actions that accomplish the assigned tasks. The intermediate subordinate controllers 624A, 624B may be configured so that each may be capable of generating commands (for respective controllers subordinated thereto) independently of the high level controllers 622 as will be described further below.

Figure 8:
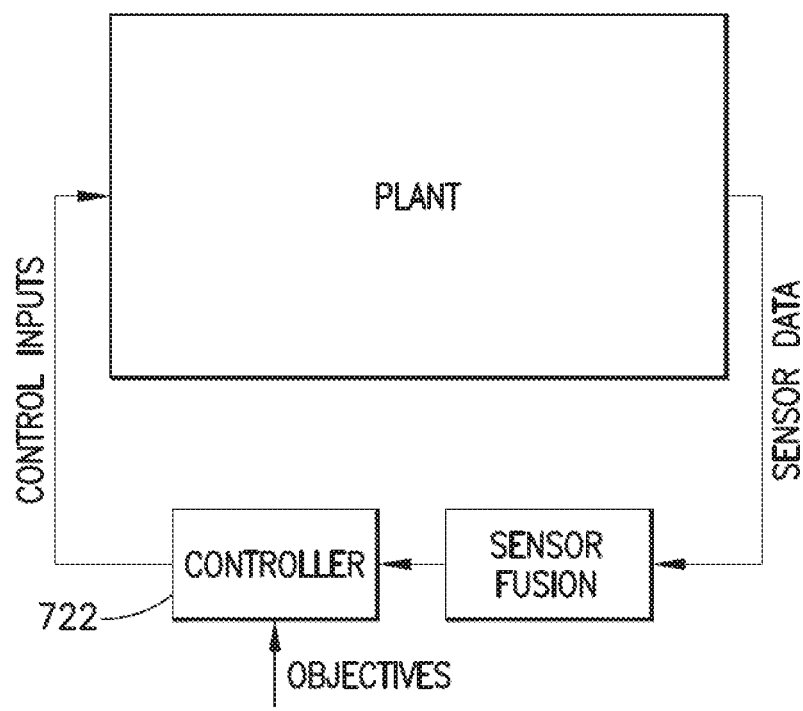
FIG. 8 is a schematic illustration of a portion of control system in accordance with aspects of the disclosed embodiment.
Figure 9:
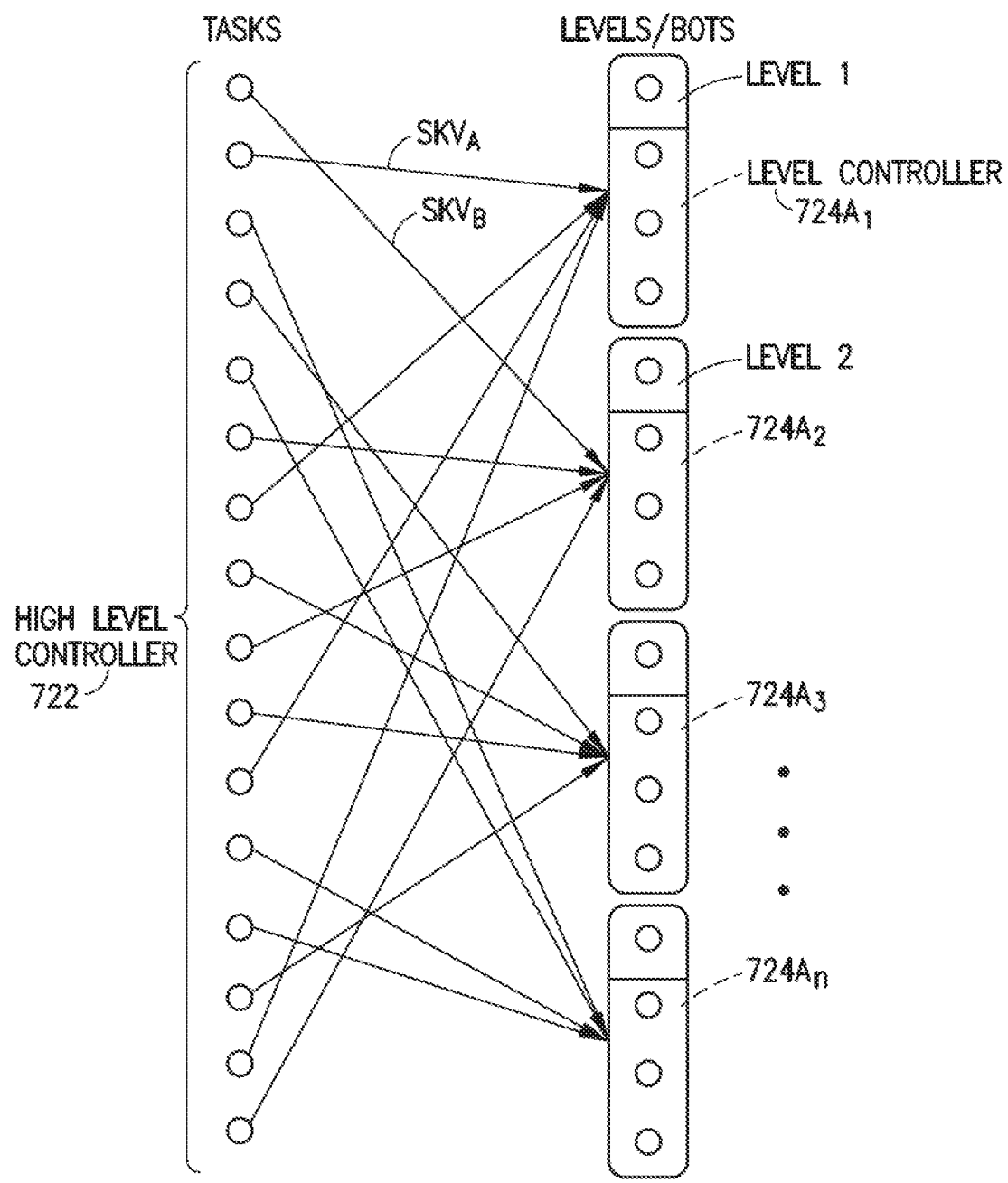
FIG. 9 is a schematic illustration of a portion of control system in accordance with aspects of the disclosed embodiment.

In accordance with an aspect of the disclosed embodiment, the control system may incorporate what may be referred to as model predictive control (MPC), wherein one or more models 747 (see also FIG. 7), such as, of the storage and retrieval engine 147 and/or components thereof, communicate and inform the control nodes or level controllers 722, 724 (having level controllers $724A_{1-n}$ generally referred to as level controller/control node 724A and $724B_{1-n}$ generally referred to as vertical controller/control node 724B) of the PNC controller 120T (to the extent common portions of the control system are shown in FIGS. 6 and 7, similar features are similarly numbered). In one aspect MPC is used by each control node 722, 724A, 724B of the PNC controller 120T. By way of example, the control section may include a system model 747, that models performance aspects, and constraints of components (e.g. lift modules, the storage structure, rovers, charging stations, input and output cells, etc.) of the storage and retrieval engine 147 and interfacing structure of the storage space 148. The system model solution may explore state trajectories for actions, such as transportation of store units in the order list to each of the selectable storage locations (previously described). The system model may be updated, for example, via sensory and actuation data from lower level controllers, on a substantially real time basis, enabling "on the fly" determination of optimum solutions over a predetermined time period. A state maintenance and estimation module 748 may be provided, which may be coupled to the state models and may facilitate estimation and maintenance of state trajectories generated with the state model. The state trajectory estimates thus are dynamic and may account for uncertainty and disturbances, changes in resources, objectives and/or constraints and may be updated over a desired segment of the predetermined time period according to various disturbances and/or triggers (e.g. receding planning horizon, request for subordinate node, level shutdown, rover failure, lift module shut down, storage pick action failure, storage put/place action failure, etc.). Referring also to FIG. 8, as noted before, the optimal solutions (which may define the performance efficiency potential previously described) for each of the selectable storage locations (from the SRS control portion 120S, shown also in FIG. 7) may be provided to the control node (e.g. a high level controller or node) 722 of the PNC controller 120T. The high level control node 722 may thus proceed to select from the selectable location list, the storage location for each store unit (such as previously described by balancing the performance efficiency potential against the SRS optimization value) and generate corresponding tasks(s) for the control nodes (e.g. subordinate controllers or nodes) 724A, 724B that satisfy the transport objective associated with the store unit and selected storage location (e.g. pick certain stock keeping unit (SKU) from selected storage location and move to output cell and/or place certain SKU from input cell in selected storage location). The high level control node 722 may generate the tasks commensurate with the control configuration of the subordinate controller(s) 724A, 724B. Moreover, the control configuration may conform to the arrangement of the SRE 147 components. By way of example, subordinate controllers 724A$_{1-n}$, (otherwise referred to herein as level controllers) may be provided for controlling actions at each level of the transport system (e.g. in one aspect the SRE 147 may include rovers/bots/independent autonomous vehicles that move store units on levels). As may be realized from FIG. 7, the rovers may have rover controllers subordinated to the level controllers 724A$_{1-n}$ for the level(s) on which the rovers may be operating. In order to achieve the transport objective (e.g. pick/place SKU from/to the selected storage location) the high level controller 722 may generate corresponding task(s) for the level controller(s) 724A$_{1-n}$ controlling the rovers on such levels where the given SKU (store unit) is to be handled and transported by the rover(s). This is schematically depicted in FIG. 8, wherein if SKU A is to be moved on level 1 according to the objective of the PNC controller 120T, the high level controller 722 generates a corresponding task for the corresponding level controller 724A$_1$ (e.g. move SKU A from the selected storage location on level 1).

As noted before, the level controller 724 (at a subordinate level to the higher level controller 722) may be configured for independently generating commands to the still lower level controllers (e.g. the rover controllers subordinated to the respective level controllers 724A$_{1-n}$) to perform actions that effect the task assigned to the respective level controller 724A$_{1-n}$. In one aspect, the level controller 724A$_{1-n}$ may independently determine the rover 110 assignments that will handle and move the store units corresponding to the tasks assigned the level controller 724A$_{1-n}$ by the high level controller 722. The level controller 724A$_{1-n}$ may also use model predictive control in determining assignments for the rovers 110 (referring again to FIG. 7, a rover router 749 may be provided). The level controller(s) 724A$_{1-n}$ thus may be configured to solve the rover 110 routing problem and may resolve traffic management and routing destination to provide an optimal solution to rover tasking. The level controller 724A$_{1-n}$ may select the optimal rover 110 from the selectable rovers 110 on the respective level and generate the rover assignment to the task. The level controller(s) 724A$_{1-n}$ assignments to the rovers 110 (or rover controllers) may determine destination (e.g. the selected storage location of the ordered SKU according to the task assignment) and path for the rover 110 to move from origin or initial location of the rover 110 on the level to the assigned destination. In one aspect, the storage locations 130S (FIG. 1) may be arrayed along storage/picking aisles 130A (FIG. 1), that may be interconnected by transfer decks 130B (FIG. 1) providing substantially open or undeterministic riding surfaces (a suitable example of which is described in U.S. patent application Ser. No. 12/757,220 filed on Apr. 9, 2010, previously incorporated by reference). Accordingly, multiple paths may be available for the rover 110 to proceed from the origin (at the time of tasking) to the destination. The level controller solution may select the optimal path for the given rover 110 and the problem of rover assignment and routing may be solved in a coordinated manner for all rovers 110 on the level over a predetermined period of time. Each rover assignment (destination and path) may thus be optimized over the predetermined period of time (e.g. horizon), and the controller solution may be dynamically updated for desired time segments in the predetermined period of time to account for changing conditions, objectives, resources and parameters.

As seen in FIG. 7, the PNC controller 120T may include other intermediate subordinate controllers 724B that may provide plan and control for other segments of the storage and retrieval system 100. In one aspect, vertical controller(s) 724B$_{1-n}$ may be provided. The high level controller 722 may assign tasks to the vertical controller(s) 724B$_{1-n}$ in a similar manner to the level controller 724A$_{1-n}$ tasks. As may be realized the vertical controller tasks represent the vertical (e.g. changing levels) component of the transport objectives to be accomplished by the PNC controller 120T. The vertical controller(s) 724B$_{1-n}$ may be responsible for assigning tasks to the vertical transporter(s) (e.g. lift modules 150) to optimize the performance within the respective constraints.

In accordance with one or more aspect of the exemplary embodiment, an automated storage and retrieval system comprises a storage space with storage locations defined therein; an automated transport system connected to the storage space and configured to transport store units for storage in the storage locations and retrieval from the storage locations; and a control system disposed for managing throughput performance of the automated storage and retrieval system, the control system being operably coupled to the automated transport system and having more than one separate and distinct control sections each configured for managing throughput performance with respect to a common group of the storage locations, wherein at least one of the control sections manages aspects of throughput performance of the common group independent of another of the control sections.

In accordance with one or more aspects of the disclosed embodiment, the other control section is configured for managing other aspects of throughput performance of the common group of storage locations that are different than the aspects managed by the at least one of the control sections.

In accordance with one or more aspects of the disclosed embodiment, the at least one control section is communicably coupled to the other control section and wherein the at least one control section is arranged to communicate information regarding the aspects of throughput performance managed thereby to the other control section.

In accordance with one or more aspects of the disclosed embodiment, the at least one control section is communicably coupled to the other control section and wherein the other control section is arranged to receive information from the at least one control section and incorporate the information from the at least one control section into throughput performance managing determinations performed by the other control section.

In accordance with one or more aspects of the disclosed embodiment, the information from the at least one control section incorporated into throughput performance managing determinations of the other control section is related to aspects of throughput performance managed independently by the at least one control section.

In accordance with one or more aspects of the disclosed embodiment, the automated transport system comprises at least one independent automated vehicle configured for holding and transporting store units to and from the storage locations.

In accordance with one or more aspects of the disclosed embodiment, the at least one independent automated vehicle is configured to traverse a transport space disposed in the storage space, the transport space being arranged to define access for the at least one independent automated vehicle to each storage location of the storage space.

In accordance with one or more aspects of the disclosed embodiment, the at least one independent automated vehicle is configured so that it traverses the transport space to at least one of the storage locations via un-deterministic paths.

In accordance with one or more aspects of the disclosed embodiment, the automated transport system comprises at least a lift configured for raising and lowering store units between levels of the storage locations.

In accordance with one or more aspects of the disclosed embodiment, the automated transport system comprises a lifting and lowering transport section for transporting store units between storage levels at different heights of the storage space, and comprises a horizontal transport section for transporting store units to and from storage locations of at least one of the storage levels, wherein the lifting and lower transport section and the horizontal transport section are connected to each other.

In accordance with one or more aspects of the disclosed embodiment, an automated storage and retrieval system comprises a storage space with storage locations distributed therein; an automated storage and retrieval engine coupled to the storage space and arranged to transport, store and retrieve store units from storage locations of the storage space; and a control system communicably coupled to the automated storage and retrieval engine and configured for managing storage and retrieval throughput performance of a common group of the storage locations of the storage space, the control system having more than one separate and distinct controllers managing throughput performance wherein, a first controller of the more than one controllers is configured for controlling the engine to effect transport of store units to and from storage locations of the common group, and a second controller of the more than one controllers is configured for controlling the disposition of store units in the storage locations of the common group.

In accordance with one or more aspects of the disclosed embodiment, at least one of the first and second controllers is operably independent from the other so that a control portion effected by the at least one of the first and second controllers and related to the throughput performance is decoupled from another control portion effected by another of the first and second controllers and related to the throughput performance.

In accordance with one or more aspects of the disclosed embodiment, the first and second controllers are communicably connected to each other, the other controller being configured to receive information from the operably independent controller and incorporate the information in effecting the other control portion.

In accordance with one or more aspects of the disclosed embodiment, the first controller or second controller defines an independent controller that provides the control system information effecting storage and retrieval and throughput performance independent of another of the first controller or second controller.

In accordance with one or more aspects of the disclosed embodiment, the other controller provides the control system other information effecting storage and retrieval and throughput performance, the other information being based on the independent information from the independent controller.

In accordance with one or more aspects of the disclosed embodiment, the independent information is related to determination of storage location for a predetermined one of the store units, and is based on predetermined characteristic of the storage location and predetermined characteristics of neighboring storage locations.

In accordance with one or more aspects of the disclosed embodiment, the independent information represents storage efficiency of the common group of storage locations.

In accordance with one or more aspects of the disclosed embodiment, the other information provides a determination of a storage location for the predetermined store unit and the independent information provides several selectable storage locations for the predetermined store unit, each of the selectable storage locations having a different storage efficiency associated therewith.

In accordance with one or more aspects of the disclosed embodiment, the other controller is configured to determine a storage location for the predetermined store unit by selecting the storage location from the several selectable storage locations provided by the independent information.

In accordance with one or more aspects of the disclosed embodiment, the other controller is configured to effect the selection by balancing, for each selectable storage location, the storage efficiency associated with the selectable storage location against throughput performance efficiency associated with the selectable storage location.

In accordance with one or more aspects of the disclosed embodiment, the other controller is configured to determine the throughput performance efficiency associated with each selectable storage location.

In accordance with one or more aspects of the disclosed embodiment, an automated storage and retrieval system comprises a storage space with storage locations defined therein; an automated transport system connected to the storage space and comprising automated components configured to transport store units for storage in the storage location and retrieval from the storage locations; and a control system disposed for managing throughput performance of the automated storage and retrieval system, the control system having a distributed hierarchical arrangement comprising one or more high level controllers, one or more lower level controllers communicably connected to the one or more high level controllers, and one or more base controllers communicably connected to the lower level controllers, the one or more lower level controllers intervening between the one or more base controllers and the one or more high level controllers; wherein the one or more high level controllers is configured for generating high level tasks effecting throughput performance and managing the high level tasks including assigning high level tasks that determine distinct storage locations of corresponding store units throughput by the automated storage and retrieval system to the one or more lower level controllers.

In accordance with one or more aspects of the disclosed embodiment, the one or more lower level controllers are configured for generating commands for the one or more base controllers, the commands effecting performance of the tasks assigned the one or more lower level controllers, and are configured so that the commands are generated by the one or more lower level controllers independent of the one or more high level controllers wherein performance of the assigned tasks is managed by the lower level controllers independent of the one or more high level controllers.

In accordance with one or more aspects of the disclosed embodiment, the one or more lower level controllers are configured for selecting automated components to effect performance of the assigned tasks, and for effecting selection of the automated components independent of the one or more high level controllers.

In accordance with one or more aspects of the disclosed embodiment, the one or more base controllers interface with and are configured for generating command signals effecting control of the automated components automation.

In accordance with one or more aspects of the disclosed embodiment, each of the one or more lower level controllers is arranged for controlling a different group of the automated components, and the one or more high level controllers is configured for selecting and assigning high level tasks to one of the one or more lower level controllers in accordance with a predetermined characteristic of the group of automated components controlled by that lower level controller.

In accordance with one or more aspects of the disclosed embodiment, the predetermined characteristic is a disposition of the group of automated components within the storage space.

In accordance with one or more aspects of the disclosed embodiment, each of the one or more lower level controllers is a group controller arranged for controlling a different group of the automated components so that the automated components of the group corresponding to the lower level controller are different and distinct from other automated components of other groups, and wherein the lower level controller is configured for independently selecting at least one of the automated components from the corresponding group for effecting performance of at least one of the assigned tasks.

In accordance with one or more aspects of the disclosed embodiment, the lower level controller is configured for directing the selected automated component to a storage location in accordance with the at least one assigned task.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. An automated storage and retrieval system comprising:
a storage space with storage locations defined therein;
an automated transport system connected to the storage space and comprising vertical lifts configured to vertically transport store units for storage in the storage locations and retrieval from the storage locations; and
a control system disposed for managing throughput performance of the automated storage and retrieval system, the control system having a distributed hierarchical arrangement comprising one or more high level controllers, one or more lower level vertical transport controllers communicably connected to the one or more high level controllers, and one or more base lift controllers communicably connected to the lower level vertical transport controllers, the one or more lower level vertical transport controllers intervening between the one or more base lift controllers and the one or more high level controllers, where at least one of the lower level vertical transport controllers independently manages request response aspects of throughput performance of a common group of the vertical lifts for a common group of output store units independent of another common group of output store units, the request response aspects of the throughput performance being responsive separately from each request to output store units from the storage locations but distinct from each of the requests to input or output store units from the storage locations;
wherein the one or more high level controllers is configured for generating high level tasks effecting throughput performance and managing the high level tasks including assigning high level tasks to the one or more lower level vertical transport controllers that determine vertical throughput of the common group of output store units with the common group of the vertical lifts.

2. The automated storage and retrieval system of claim 1, wherein the one or more lower level vertical transport controllers are configured for generating commands for the one or more base lift controllers, the commands effecting performance of the tasks assigned the one or more lower level vertical transport controllers, and are configured so that the commands are generated by the one or more lower level vertical transport controllers independent of the one or more high level controllers wherein performance of the assigned tasks is managed by the lower level vertical transport controllers independent of the one or more high level controllers.

3. The automated storage and retrieval system of claim 1, wherein the one or more lower level vertical transport controllers are configured for selecting vertical lifts to effect performance of the assigned tasks, and for effecting selection of the vertical lifts independent of the one or more high level controllers.

4. The automated storage and retrieval system of claim 1, wherein the one or more base lift controllers interface with and are configured for generating command signals effecting control of the vertical lifts automation.

5. The automated storage and retrieval system of claim 1, wherein each of the one or more lower level vertical transport controllers is arranged for controlling a different group of the vertical lifts, and the one or more high level controllers is configured for selecting and assigning high level tasks to one of the one or more lower level vertical transport controllers in accordance with a predetermined characteristic of the group of vertical lifts controlled by that lower level vertical transport controller.

6. The automated storage and retrieval system of claim 5, wherein the predetermined characteristic is a disposition of the common group of output store units with respect to the common group of vertical lifts.

7. The automated storage and retrieval system of claim 1, wherein each of the one or more lower level vertical transport controllers is a group controller arranged for controlling a different group of the vertical lifts so that the vertical lifts of the group corresponding to the lower level vertical transport controller are different and distinct from other vertical lifts of other groups, and wherein the lower level vertical transport controller is configured for independently selecting at least one of the vertical lifts from the corresponding group for effecting performance of at least one of the assigned tasks.

8. The automated storage and retrieval system of claim 7, wherein the lower level vertical transport controller is configured for directing the selected vertical lift to a storage location in accordance with the at least one assigned task.

9. A method for managing throughput performance of an automated storage and retrieval system, the method comprising:
provided a storage space with storage locations defined therein;
vertically transporting store units for storage in the storage locations and retrieving the store units from the storage locations with vertical lifts of an automated transport system;
managing throughput performance of the automated storage and retrieval system, with a control system, the control system having a distributed hierarchical arrangement comprising one or more high level controllers, one or more lower level vertical transport controllers communicably connected to the one or more high level controllers, and one or more base lift controllers communicably connected to the lower level vertical transport controllers, the one or more lower level vertical transport controllers intervening between the one or more base lift controllers and the one or more high level controllers, where at least one of the lower level vertical transport controllers independently manages request response aspects of throughput performance of a common group of the vertical lifts for a common group of output store units independent of another common group of output store units, the request response aspects of the throughput performance being responsive separately from each request to output store units from the storage locations but distinct from each of the requests to input or output store units from the storage locations; and
generating, with the one or more high level controllers, high level tasks effecting throughput performance and managing, with the one or more high level controllers, the high level tasks including assigning high level tasks to the one or more lower level vertical transport controllers that determine vertical throughput of the common group of output store units with the common group of the vertical lifts.

10. The method of claim 9, further comprising generating commands for the one or more base lift controllers, with the one or more lower level vertical transport controllers, the commands effecting performance of the tasks assigned the one or more lower level vertical transport controllers, where the commands are generated by the one or more lower level vertical transport controllers independent of the one or more high level controllers wherein performance of the assigned tasks is managed by the lower level vertical transport controllers independent of the one or more high level controllers.

11. The method of claim 9, further comprising selecting vertical lifts, with the one or more lower level vertical transport controllers, to effect performance of the assigned tasks, and effecting, with the one or more lower level vertical transport controllers, selection of the vertical lifts independent of the one or more high level controllers.

12. The method of claim 9, wherein the one or more base lift controllers interface with and are configured for generating command signals effecting control of the vertical lifts automation.

13. The method of claim 9, wherein each of the one or more lower level vertical transport controllers controls a different group of the vertical lifts, and the one or more high level controllers selects and assigns high level tasks to one of the one or more lower level vertical transport controllers in accordance with a predetermined characteristic of the group of vertical lifts controlled by that lower level vertical transport controller.

14. The method of claim 13, wherein the predetermined characteristic is a disposition of the common group of output store units with respect to the common group of vertical lifts.

15. The method of claim 9, wherein each of the one or more lower level vertical transport controllers is a group controller that controls a different group of the vertical lifts so that the vertical lifts of the group corresponding to the lower level vertical transport controller are different and distinct from other vertical lifts of other groups, and wherein the lower level vertical transport controller independently selects at least one of the vertical lifts from the corresponding group for effecting performance of at least one of the assigned tasks.

16. The method of claim 15, further comprising directing the selected vertical lift, with the lower level vertical transport controller, to a storage location in accordance with the at least one assigned task.

* * * * *